United States Patent
Bradd et al.

(10) Patent No.: US 7,933,279 B1
(45) Date of Patent: Apr. 26, 2011

(54) VOICE OVER PACKET NETWORK ARRANGEMENT AND METHOD

(75) Inventors: Patrick D Bradd, Maidenhead (GB); Bryan J Miller, Cookham (GB); James Shields, Reading (GB)

(73) Assignee: Nortel Networks Limited, Mississauga, Ontario (CA)

( * ) Notice: Subject to any disclaimer, the term of this patent is extended or adjusted under 35 U.S.C. 154(b) by 0 days.

(21) Appl. No.: 09/473,726

(22) Filed: Dec. 28, 1999

(51) Int. Cl.
*H04L 12/28* (2006.01)

(52) U.S. Cl. .................. 370/401; 370/351; 370/352

(58) Field of Classification Search .................. None
See application file for complete search history.

(56) References Cited

U.S. PATENT DOCUMENTS

| | | | | |
|---|---|---|---|---|
| 5,231,631 A * | 7/1993 | Buhrke et al. | | 370/230 |
| 6,141,341 A * | 10/2000 | Jones et al. | | 370/352 |
| 6,625,119 B1 * | 9/2003 | Schuster et al. | | 370/230 |
| 6,667,968 B1 * | 12/2003 | Tran | | 370/352 |
| 6,680,952 B1 * | 1/2004 | Berg et al. | | 370/467 |
| 6,931,111 B1 * | 8/2005 | Coffee | | 379/201.12 |
| 6,950,441 B1 * | 9/2005 | Kaczmarczyk et al. | | 370/467 |

* cited by examiner

*Primary Examiner* — Robert W Wilson
(74) *Attorney, Agent, or Firm* — Trop, Pruner & Hu, P.C.

(57) ABSTRACT

A communications network arrangement provides voice over IP or voice over ATM services. The network arrangement comprises a first media gateway controller controlling a first gateway and provided with a first operating protocol, a second media gateway controller controlling a second gateway and provided with a second operating protocol, and a gateway address translator incorporating proxies for the first and second gateways. The gateway address translator provides a relay function for messaging between each media gateway controller and its corresponding gateway, and a virtual bearer function for messaging between the media gateway controllers. This facilitates inter-working between products supplied by different vendors.

18 Claims, 8 Drawing Sheets

VOICE OVER PACKET NETWORK ARRANGEMENT AND METHOD

FIELD OF THE INVENTION

This invention relates to arrangements and methods for call establishment in voice over IP and voice over ATM networks.

BACKGROUND TO THE INVENTION

A recent development in the communications field has been the introduction of networks providing voice over IP (VoIP) and voice over ATM services. The advantage to users is the significant reduction in costs, particularly for calls set up over long distances which can often be billed at local call rates. In such networks, a first network interfaces with a managed IP network via one or more media gateways, which gateways are managed by media gateway controllers.

In the simplest architecture, a single media gateway controller (MGC) controls a number of media gateways (MG). This architecture, while valid for some call-types, will not become the predominant topology in voice over IP or voice over ATM networks, for a number of reasons. Firstly, a single media gateway controller will not have the capacity to control all media gateways in a large network. Secondly, for regulatory reasons in some countries, a media gateway controller will have to be located in the same country as those media gateways that it controls. Thirdly, service providers are now demanding vendor interoperability with media gateway controller from more than one vendor in their networks. Interoperability between service providers will be also required, with media gateway controllers and media gateways from more than one service provider communicating with each other.

If this interoperability is to be achieved, then a number of key issues will first have to be addressed. Specifically, these are:—
  a) Communication between Media Gateways from different vendors for the bearer path for VoIP and VoATM.
  b) Communication between a media gateway controller from one vendor and a media gateway from another vendor.
  c) Communication between a media gateway controller from one vendor and a media gateway controller from another vendor.

Currently, in the industry, the standards to achieve the first requirement (a) are pretty much in place. A codec (such as G.711), transported in RTP (rapid transport protocol), carried on UDP (user data protocol), on top of IP for VoIP is the currently recognized industry standard.

An industry standard for the second requirement (b) is also nearing acceptance. While there are many device control protocols (SGCP or Simple Gateway Control Protocol, IPDC or Internet Protocol Device Control, MGCP or Media Gateway Control Protocol, and, of course, some proprietary ones, vendor interoperability between media gateway controllers and media gateways is generally achievable.

The third requirement (c) is however a much more difficult issue. A number of options have been tentatively proposed, but none of these has provided a satisfactory solution. One such proposal is the extension of ISUP to carry bearer information. This is referred to as ISUP+, or Q.BIC. Current proposals suggest the use of CCS7 (Common Channel Signaling System 7) network for carriage of this information, but many service providers do not want to involve a CCS7 network in their Voice over Packet network design. Another proposed solution is that of changing the session initiation protocol SIP (RFC 2543) to allow carriage of both SDP or Session Description Protocol (RFC 2327) and CCS7 user part information to allow PSTN interconnect and transparency, and using this information as the media gateway controller to media gateway controller (MGC to MGC) communication protocol. This is typically referred to as SIP BCP T (SIP Best Common Practices for Telephony). While this effort is currently under active consideration, a ratified, working protocol has yet to be defined. A third proposal is the use of a vendor specific protocol. While this is a working solution, it is a vendor specific one, and includes information specific to the vendor specific implementation. This information will of course be proprietary and not generally available to other vendors.

In addition to the protocol problem, a further difficulty is that the media gateway controllers developed by various vendors are designed to function in a network only if the other media gateway controllers in the network are derived from that vendor's same family of products. For example, a vendor's media gateway controller might rely on sharing data across media gateway controllers such as translations, or trunk-groups, in order to function. Further, some vendors' media gateway controller products are designed such that one media gateway controller only deals with ingress half calls, and another media gateway controller deals with egress half calls. Intimate knowledge about how each media gateway controller works must be known by the other media gateway controller, and this of course generally precludes the use of products from another vendor. In addition, a media gateway controller will generally be designed to control both gateways.

Thus, even if a ratified protocol were to be defined, this would not fully address the problem and, in the absence of a suitable topology, would be difficult to achieve in the near term:

SUMMARY OF THE INVENTION

An object of the invention is to minimise or to overcome the above disadvantage.

A further object of the invention is to provide an improved arrangement and method for carrying narrow band traffic, e.g. voice traffic over an IP network.

According to a first aspect of the invention, there is provided a communications network arrangement providing voice over IP or voice over ATM services, the network arrangement comprising: a first media gateway controller controlling a first gateway, where the first media gateway controller is provided with a first operating protocol, a second media gateway controller controlling a second gateway, where the second media gateway controller is provided with a second operating protocol, and a gateway address translator incorporating proxies for said first and second gateways respectively, wherein said gateway address translator provides a relay function for messaging between each said media gateway controller and its corresponding gateway, and a virtual bearer function for messaging between said media gateway controllers.

According to another aspect of the invention, there is provided a method of interfacing media gateway controllers and media gateways having different operating protocols in a communications network arrangement providing voice over IP or voice over ATM services, the method comprising creating software proxies of said gateways with which said media gateways communicate each in its respective operating protocol.

According to another aspect of the invention, there is provided a method of providing voice over IP or voice over ATM services in a communications network arrangement comprising: a first media gateway controller controlling a first gateway, and a second media gateway controller controlling a second gateway, where the first media gateway controller is provided with a first operating protocol, and the second media gateway controller is provided with a second operating protocol, the method comprising provisioning proxies of said gateways so as to provide a relay function for messaging between each said media gateway controller and its corresponding gateway, said messaging utilising the protocol of the controller and the gateway, and a virtual bearer function for enabling messaging between said media gateway controllers.

According to another aspect of the invention, there is provided a gateway address translator for use in a communications network arrangement providing voice over IP or voice over ATM services and comprising: a first media gateway controller controlling a first gateway, and a second media gateway controller controlling a second gateway, where the first media gateway controller is provided with a first operating protocol, and the second media gateway controller is provided with a second operating protocol, the gateway address translator comprising; gateway proxies, one for each said gateway, and virtual gateways, one for each said media gateway controller, wherein said gateway proxies provide a relay function for messaging between each said media gateway controller and its corresponding gateway, and wherein said virtual gateways provide a virtual bearer function for messaging between said media gateway controllers.

According to another aspect of the invention, there is provided a communications network arrangement providing voice over IP or voice over ATM services and incorporating a plurality of media gateways and media gateway controllers therefor whereby voice calls are set up over virtual channels in the network, wherein said media gateways and media gateway controllers have different operating protocols, and wherein communications between said media gateways and media gateway controllers are relayed via proxies whereby each said media gateway and media gateway controller can send and receive communications in its own protocol.

Advantageously, the gateway address translator is provided on a storage medium as software in machine readable form. Preferably, this software is installed on and runs on a gateway controller.

A media gateway controller may also comprise a soft switch or a USP/ICE-ICE/USP pair In some applications, communication between gateway controllers may be provided via a SS7 signalling network.

BRIEF DESCRIPTION OF THE DRAWINGS

Embodiments of the invention will now be described with reference to the accompanying drawings in which:—

DETAILED DESCRIPTION OF PREFERRED EMBODIMENTS

Figure 1:
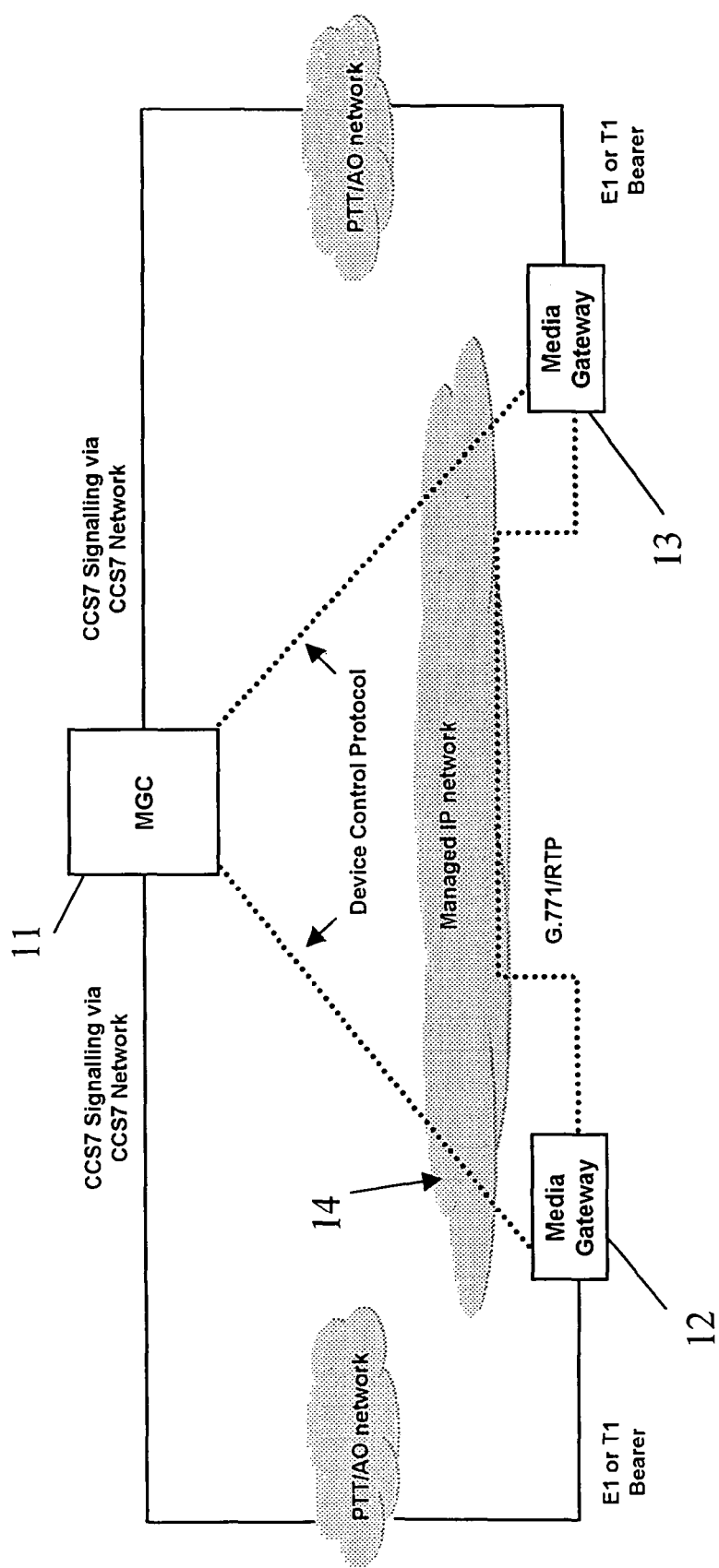
FIG. 1 is a schematic diagram of a prior art network arrangement.

Referring first to FIG. 1, which is introduced for explanatory and comparative purposes, this shows a typical network arrangement in which a single media gateway controller 11 controls first and second media gateways 12 and 13 so as to set up PTT network originating calls via a managed IP network 14. Communication between the media gateway controller and the gateways is established via a suitable device control protocol. Calls are set up via messages passed over e.g. a CCS7 (Common Channel Signaling 7) signalling path 15 to the media gateway controller 11.

Figure 2:
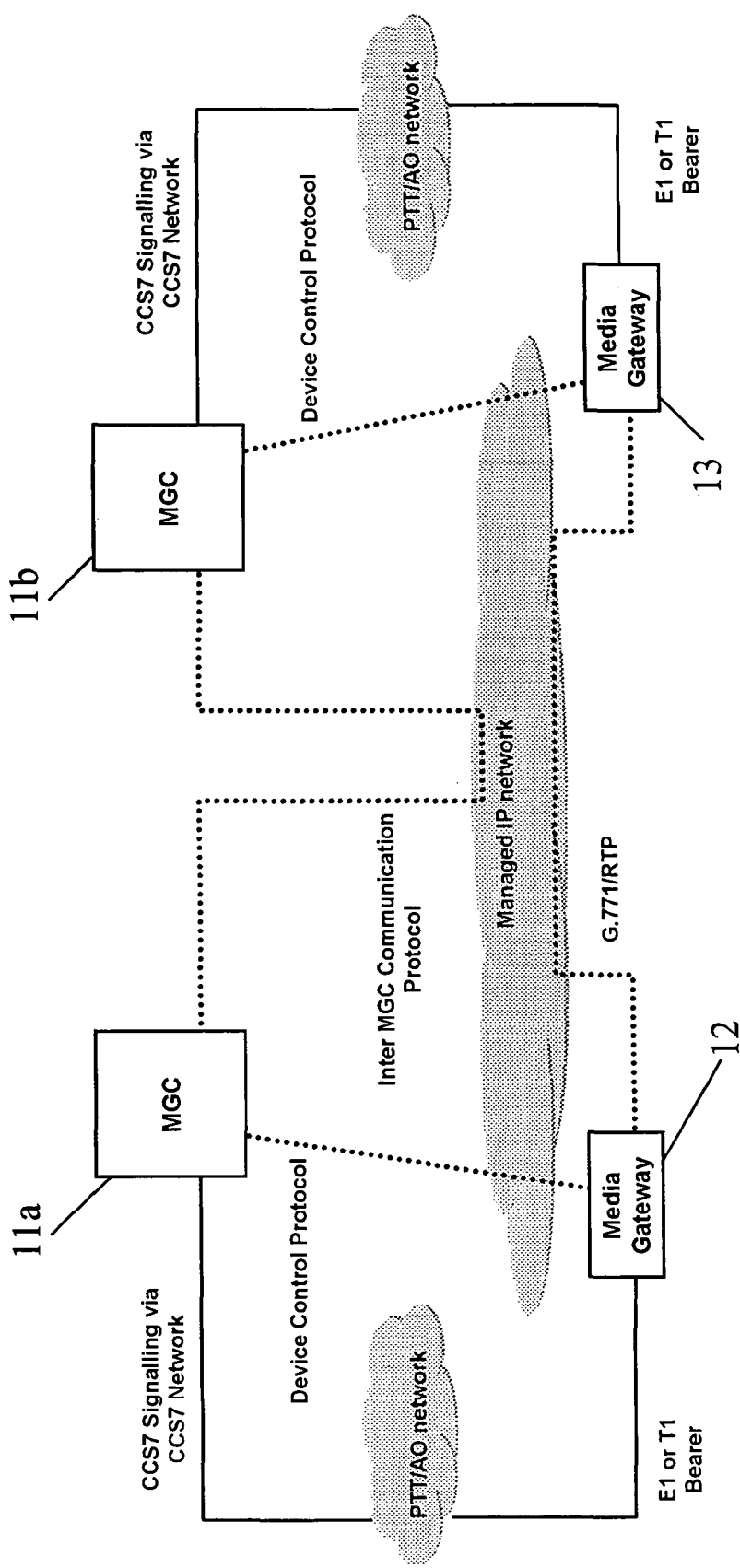
FIG. 2 shows a development of the network of FIG. 1.

FIG. 2, which is also introduced for explanatory and comparative purposes, shows a development of the network of FIG. 1 in which a further media gateway controller 11a is introduced, e.g. to extend the geographical coverage of the network and/or to accommodate a larger number of gateways. The two media gateway controllers can communicate via the managed IP network 14 using a suitable inter-MGC communication protocol, and each can communicated with its respective gateway using a device control protocol. This however presupposes that both media gateway controllers use identical communication protocols and effectively requires that they be purchased from the same vendor.

Figure 3:
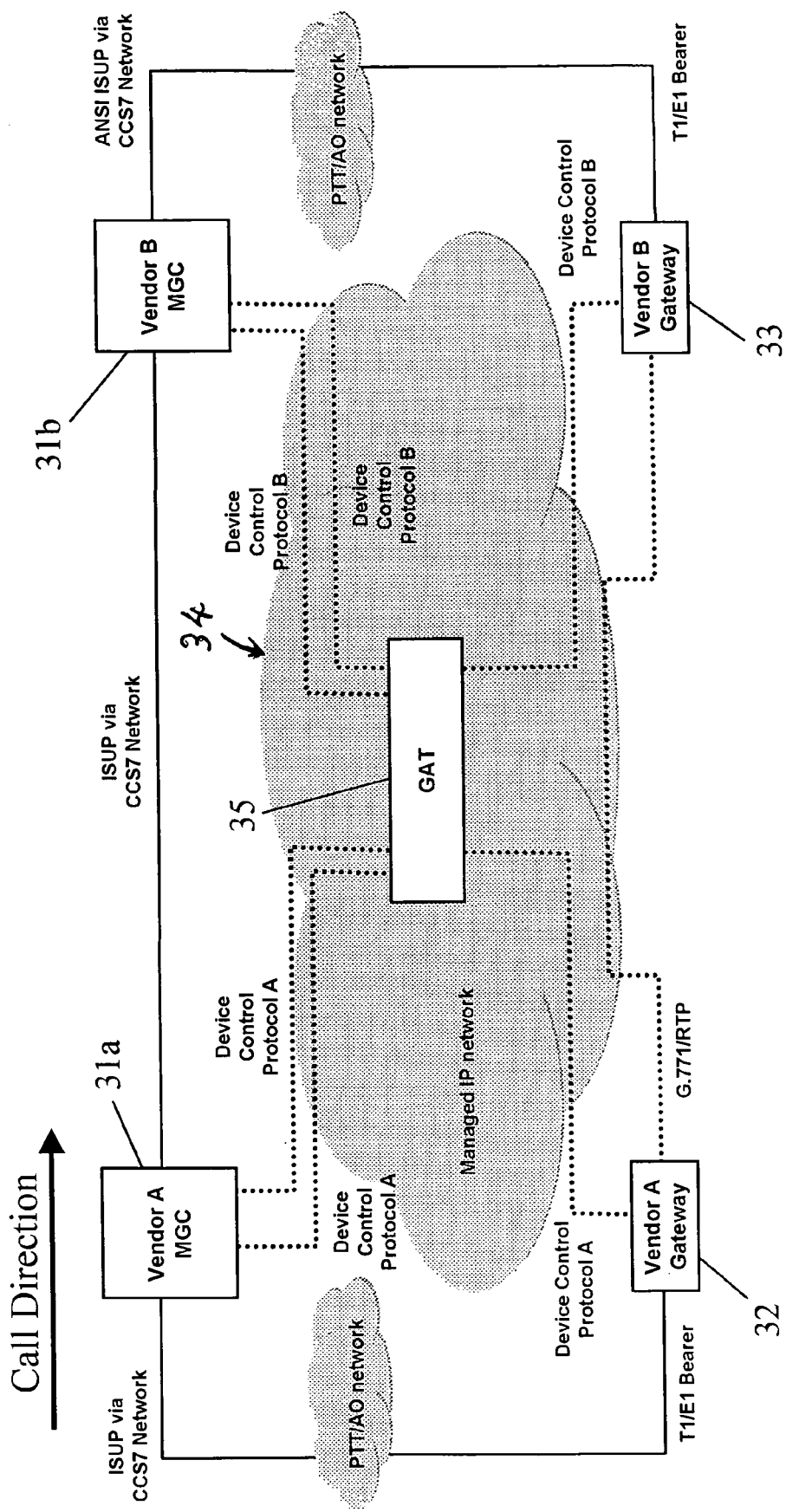
FIG. 3 shows a network construction according to a preferred embodiment of the invention.

Referring now to FIG. 3, this shows in schematic form an exemplary communications network arrangement according to a preferred embodiment of the invention. As shown in FIG. 3, the network arrangement includes a managed IP network, generally indicated as 34, to which access from one or more PTT/AO voice networks is provided via media gateways 32, 33. These gateways are supplied by different vendors and thus embody different operating protocols. Each gateway is controlled by a respective media gateway controller 31a, 31b whose protocols match those of the gateway that it is controlling. This control is effected using an appropriate device control protocol via a gateway address translator (GAD 35. Communication between the media gateway controllers is also provided via the gateway address translator 35 which interfaces and converts the respective device control protocols used by the media gateway controllers. Each media gateway controller can thus use its own device control protocol for all communications via the gateway address translator.

Signalling to provide setup of VoIP calls is advantageously effected via a CCS7 network using an appropriate ISUP (ISDN user part) protocol for the particular administration in which the media gateway controllers are operating. The gateways provide user access to G.771/RTP traffic paths 36 via the IP network for the transport of voice over IP calls that have been set up via the CCS7 signalling network.

It will of course be understood that, for the purposes of clarity and explanation, each media gateway controller is depicted in FIG. 3 as controlling a single media gateway whereas, in a practical network, a media gateway controller may well control several gateways.

Figure 4:
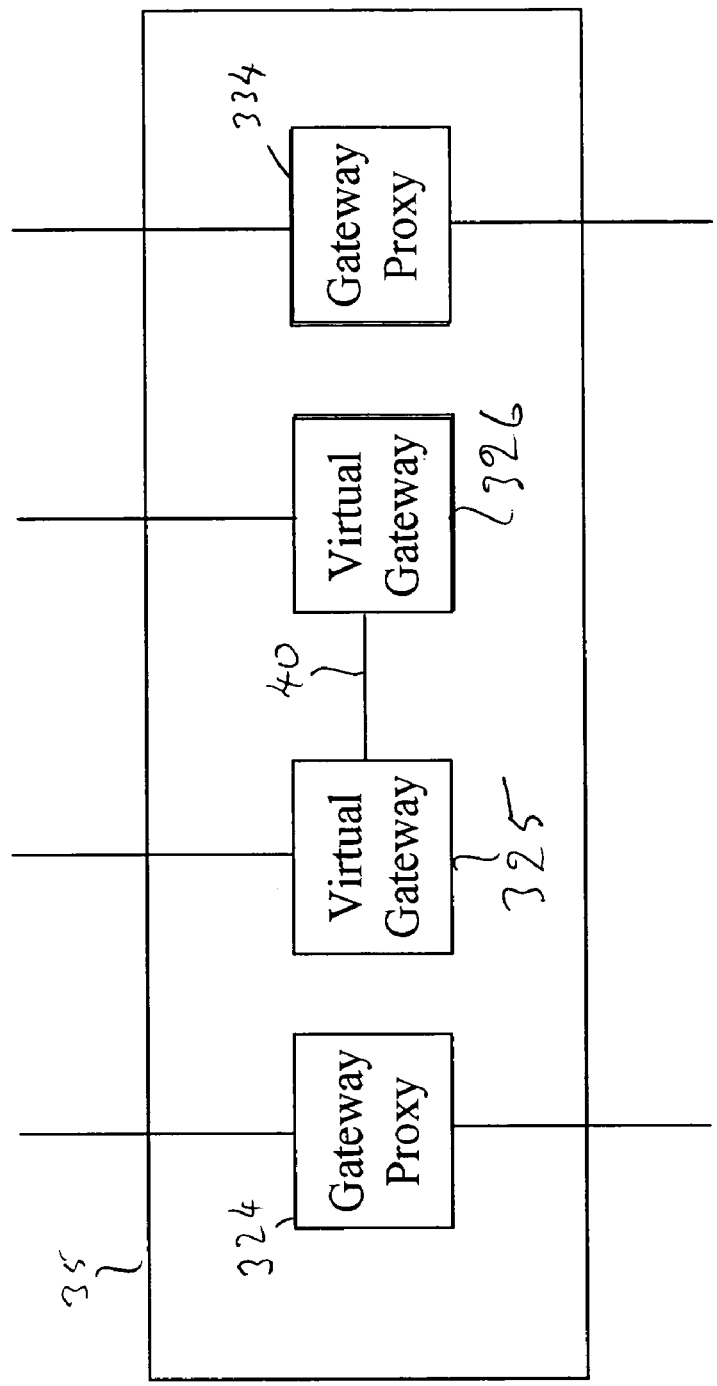
FIG. 4 shows the detail of a gateway address translator employed in the network of FIG. 3.
Figure 4C:
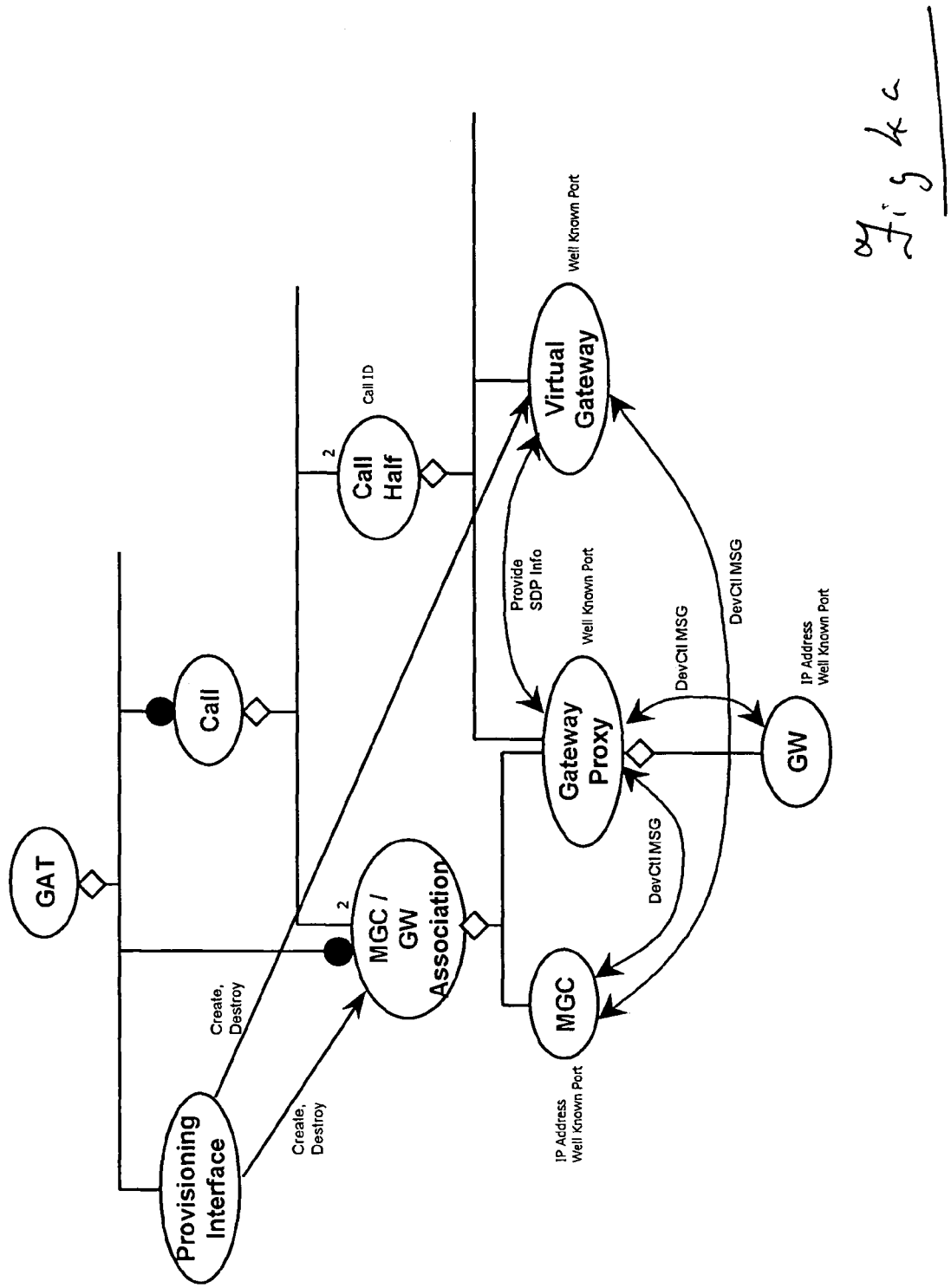
FIG. 4a shows the gateway address translator construction in further detail.

The gateway address translator 35, which is shown in further detail in FIG. 4, acts as a proxy for all media gateways in a multi-vendor, media gateway control MEGACO-style, voice over IP or voice over ATM network. The gateway address translator provides a proxy function for origination and termination gateways, and a substitute for the intermediate gateways.

There are three elements to the provisioning required to support the gateway address translator. These are:

Provisioning the gateway address translator in place of the physical gateways at the media gateway controller, and provisioning the gateway proxies at the gateway address translator;

Provisioning the physical gateways at the gateway address translator and associating with the gateway proxies;

Provisioning the intermediate virtual gateways and bearer circuits at the gateway address translator.

As depicted in FIG. 4, the translator incorporates first and second gateway proxies 324, 334 corresponding to the respective gateways 32, 33 (FIG. 3), and first and second virtual gateways 325 and 326, the latter being coupled via a virtual bearer circuit 40. The address of each proxy is provisioned at the respective media gateway controller in place of that of the respective gateway so that the controller believes it is controlling that gateway directly. The address of the media gateway controller does not need to be provisioned at the gateway address translator because the translator can extract this information when the media gateway controller registers with its gateway. This provides a two-way communication path between the gateway proxy of the gateway address translator and the media gateway controller. If the media gateway controller assumes the same well-known port is used by all gateways, a different IP address must be used for each proxy. Otherwise, different ports at the same address will be sufficient.

It will be appreciated that FIG. 4 is a functional diagram in which the various integers will be constituted by software entities.

FIG. 4a shows the construction of the gateway address translator in further detail. Again, it will be appreciated that FIG. 4a is a logical or functional diagram, as the address translator will normally be constituted in software form, e.g. as machine readable operating instructions on a storage medium.

An association is also established between the virtual circuits represented by the virtual gateway elements. It is through the association of these virtual circuits that the gateway address translator is able to relate the two calls (one supervised by the first vendor's respective media gateway controller, the other supervised by the second vendor's respective media gateway controller) which have different call identifiers.

The gateway address translator forwards device control messages between the gateway address translator and the gateway. The address of the gateway, which would ordinarily be provisioned at the respective media gateway controller, is, as discussed above, provisioned at the gateway address translator. The gateway address translator manipulates device registration messages, substituting the address of the gateway proxy in place of that of the respective media gateway controller, so that the address of the gateway address translator need not be provisioned at the gateway. This provides a two-way communication path between the gateway proxy of the gateway address translator and the gateway.

The gateway address translator receives all media gateway controller (MGC) to media gateway (MG) device control commands for all gateways involved in a call, and ensures that all gateways are aware of all the bearer information to connect VoIP streams between the gateways to establish a VoIP call. No communication between media gateway controllers containing any bearer information is therefore required and existing CCS7 messaging and CCS7 networks can be used.

The gateway address translator receives all device control messages from the media gateway controller, and responds to the media gateway controller as if the translator were the real gateway involved in the call. In effect, the media gateway controller 'thinks', wrongly, that the gateway address translator is in fact the gateway that it controls. The gateway address translator, through this proxy activity, determines what information each gateway should receive in order to properly setup the voice over IP communication.

By using the gateway address translator to proxy media gateway controller (MGC) to Media Gateway (MG) commands, communication between media gateway controllers can thus advantageously use the existing, proven CCS7 network instead of the unproven, unimplemented protocols currently being designed for media gateway controller to media gateway controller communication. As all vendors currently have diverging protocols for media gateway controller to media gateway controller communication, service providers wishing to provide a multi-vendor VoIP or VoATM network with one media gateway controller from vendor A and another media gateway controller from vendor B are now enabled to do so.

The gateway address translator advantageously comprises a software entity that can run on a separate computer platform, on a router in the IP network, or on the same computer platform running one of the media gateway controllers. Each device control protocol should provide acknowledgement of IP addresses in device control create connection messages. For example, protocols used by Nortel Networks, such as ASPEN provide for this—the gateway simply ACKs the SDP, which contains the IP address to use for the RTP stream. Protocols used by gateways from other vendors need to follow a similar convention.

Figure 5:
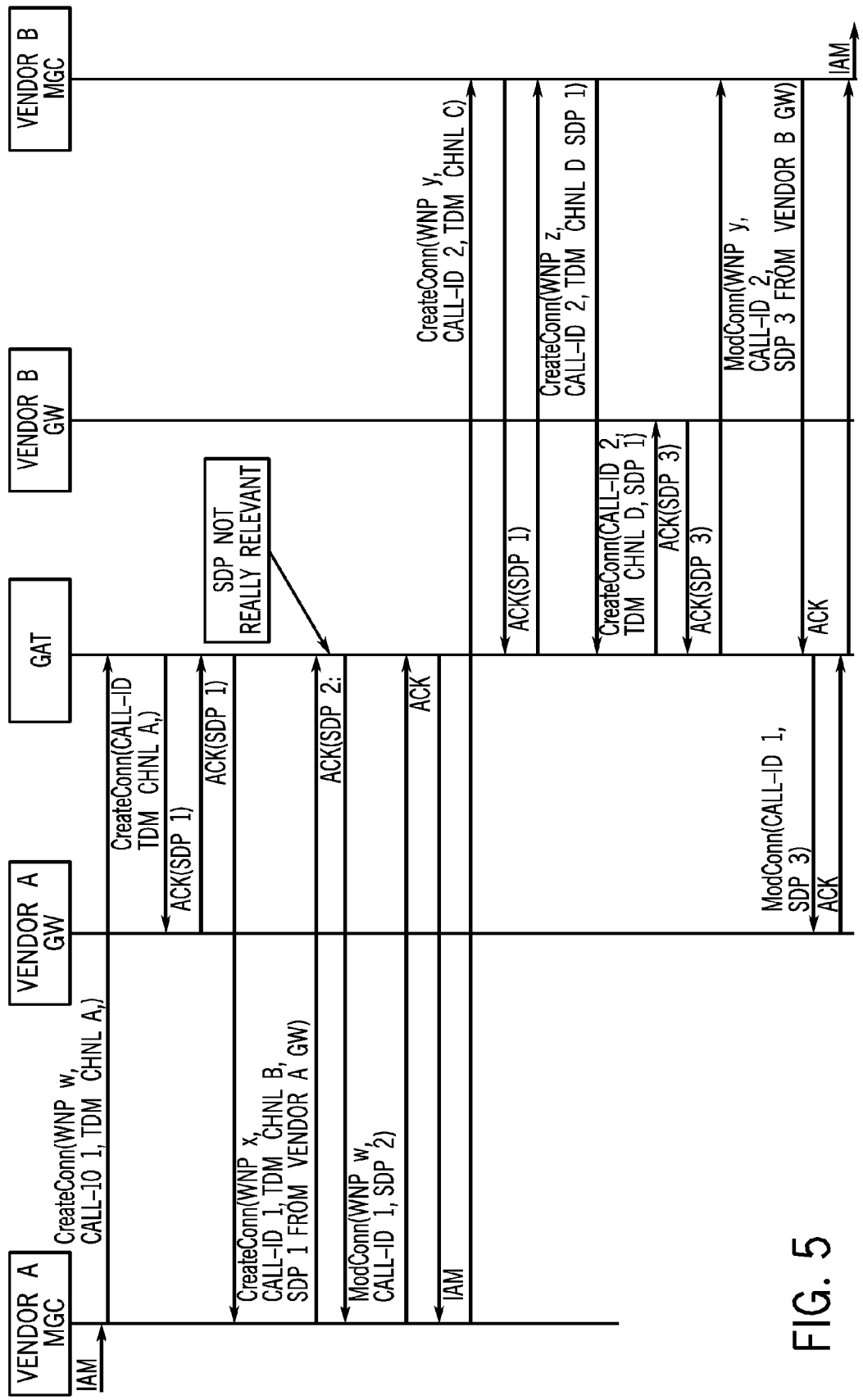
FIG. 5 is a call walkthrough diagram for the network of FIG. 3.

A call walk-through for the network of FIG. 3 is illustrated in FIG. 5. It will of course be understood that, for clarity, FIG. 5 is restricted to the call setup procedure and does not depict call progress (ACM), answer or release, as these latter features will be appreciated by the skilled worker from an understanding of the call setup process shown in the figure.

Figure 6:
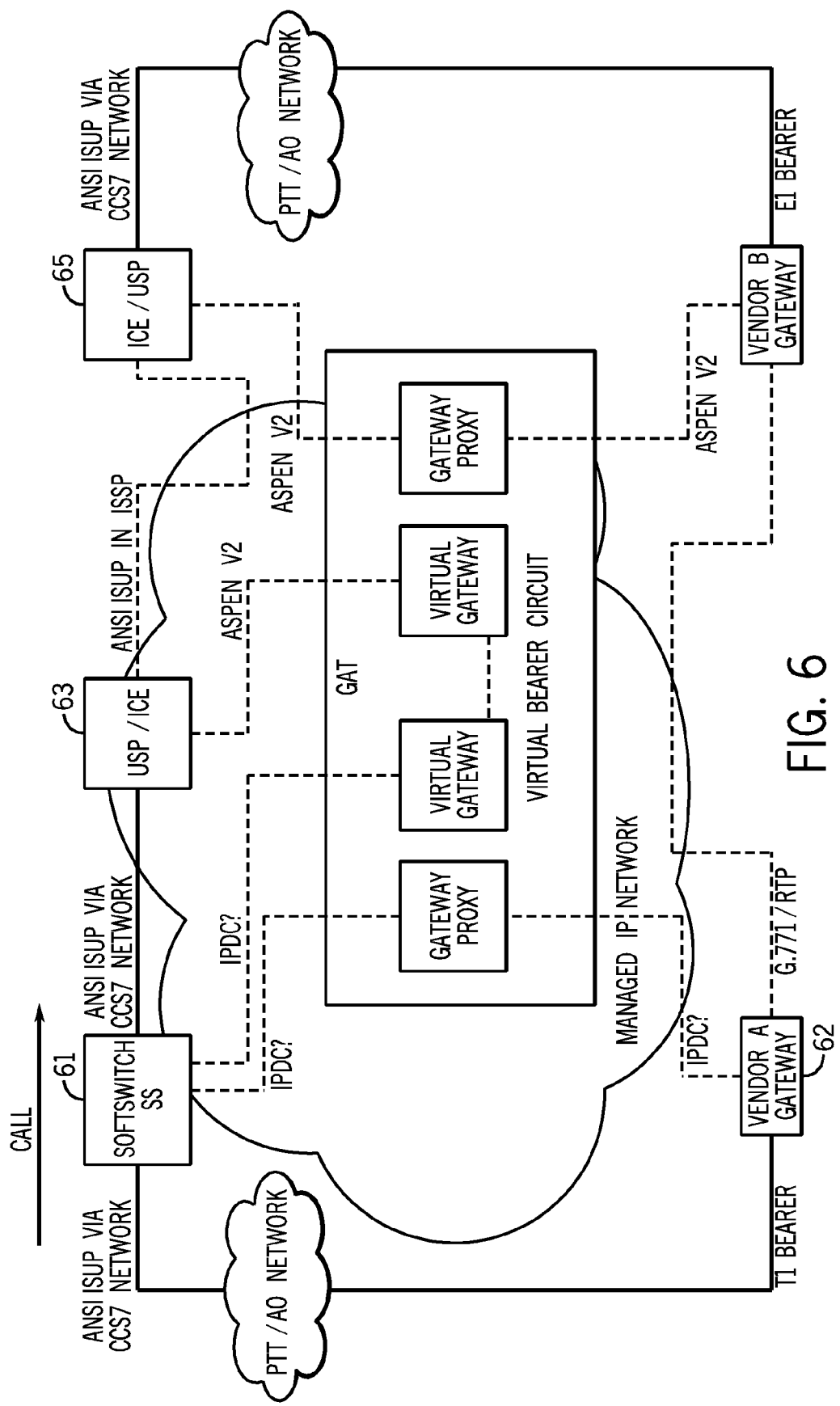
FIG. 6 shows an alternative network construction.

FIG. 6 shows an alternative network arrangement in which one media gateway controller is constituted by a soft switch 61 supplied by one vendor and controlling a respective gateway 62, and the other media gateway controller is constituted by a distributed MGC pair (63, 65) providing separate ingress and egress functions and supplied by another vendor. As before, the gateway address translator ensures that each vendor's products can use their own messaging protocols.

Figure 7:
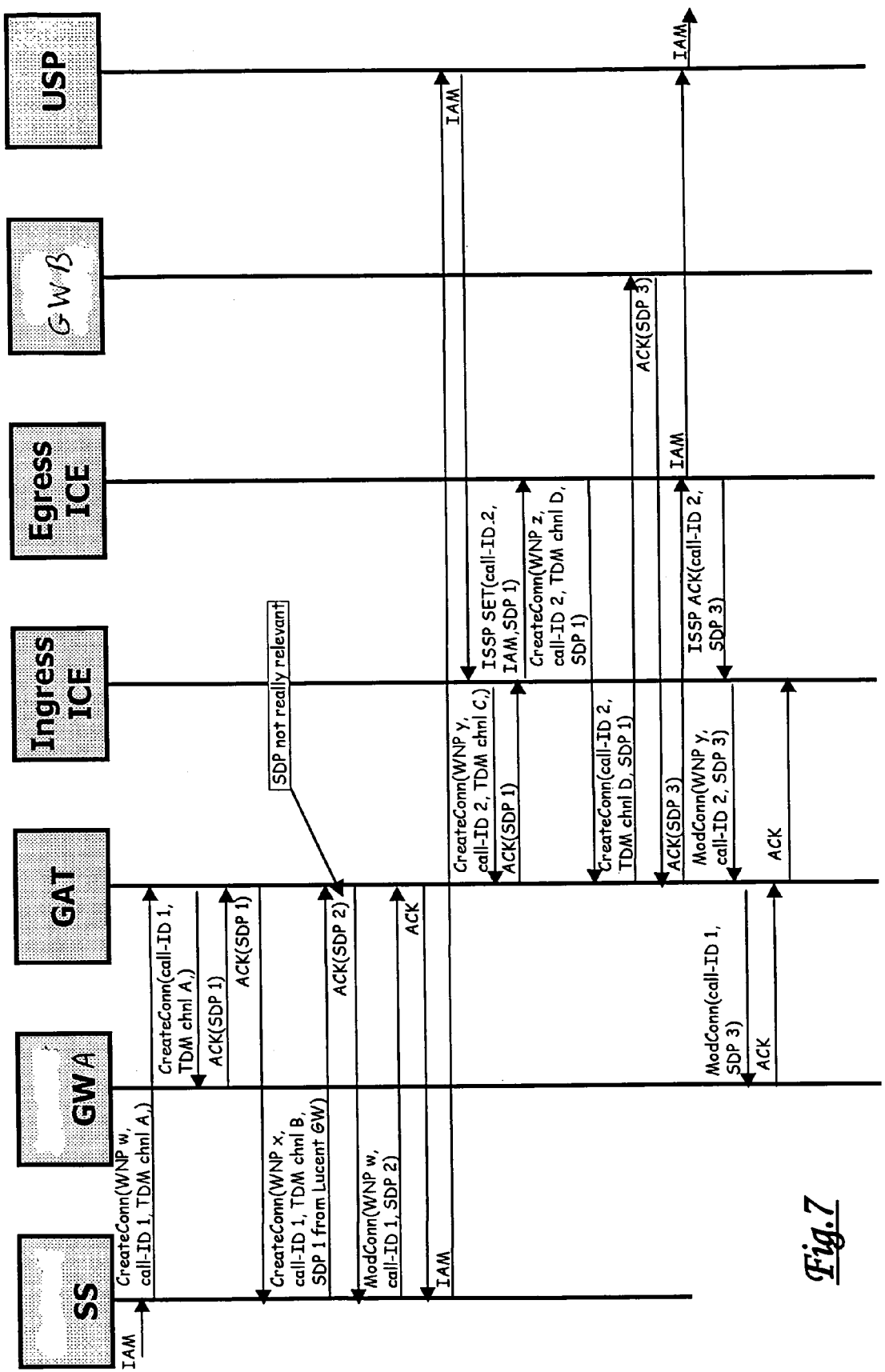
FIG. 7 is a call walk-through diagram for the network of FIG. 6.

FIG. 7 shows a call walkthrough for the network arrangement of FIG. 6. Again, in the interests of clarity, the diagram has been restricted to the call setup process.

It will be appreciated that if a media gateway controller assumes the same well-known port number is used by all gateways, a different IP address must be used for each gateway proxy on the gateway address translator. Otherwise, different ports at the same address will be sufficient. If a vendor's network management system is integrated such that the gateway element manager determines the addresses of the gateways from the same provisioning data as the media gateway controller, then the gateway proxy function of the gateway address translator must also be capable of acting as proxy for maintenance messages as well as device control messages. If the vendor's network management system is integrated such that gateways must be brought in service by an element manager before circuits are available for processing by the media gateway controller, rather than assuming they're available if they succeed on registration, then the virtual gateway must be capable of spoofing the minimal service maintenance commands of the element management system (SNMP or other).

It will be understood that the above description of a preferred embodiment is given by way of example only and that various modifications may be made by those skilled in the art without departing from the spirit and scope of the invention.

We claim:

1. A communications network arrangement providing voice over IP or voice over ATM services, the network arrangement comprising:
a first media gateway controller configured to control a first media gateway, wherein the first media gateway controller is provided with a first operating protocol,
a second media gateway controller configured to control a second media gateway, wherein the second media gateway controller is provided with a second, different operating protocol,
a computer, and
a gateway address translator executable in the computer and incorporating proxies for said first and second media gateways respectively, wherein each of the proxies in said gateway address translator is configured to receive a control message from a respective one of said first and second media gateway controllers, and in response to the control message, forward the control message to a corresponding one of the first and second media gateways, and
wherein the gateway address translator is configured to provide a virtual bearer function for messaging between said first and second media gateway controllers.

2. The communications network arrangement of claim 1, wherein said gateway address translator comprises virtual gateways, one for each of said first and second media gateway controllers, wherein the virtual gateways are configured to provide the virtual bearer function for messaging between said first and second media gateway controllers.

3. The communications network arrangement of claim 2, wherein signaling communication between said first and second media gateway controllers is provided via a signalling network.

4. The communications network arrangement of claim 3, wherein said signalling network comprises a Common Channel Signaling 7 network.

5. The communications network arrangement of claim 2 wherein said computer comprises a non-transitory machine readable storage medium storing software of said gateway address translator.

6. The communications network arrangement of claim 1, wherein at least one of said first and second media gateway controllers is implemented in a distributed architecture in which a first processor performs ingress processing and a second processor performs egress processing.

7. The communications network arrangement of claim 1, wherein at least one of said first and second media gateway controllers is implemented as a soft switch.

8. The communications network arrangement of claim 1, wherein one of the first and second media gateway controllers is included in said computer.

9. The communications network arrangement of claim 1, wherein the first media gateway controller is provisioned with an address of a first one of the proxies instead of an address of the first media gateway, and wherein the second media gateway controller is provisioned with an address of a second one of the proxies instead of an address of the second media gateway.

10. The communications network arrangement of claim 1, wherein in response to receiving the control message from said first media gateway controller, a first of said proxies is configured to:
substitute, in the control message, an address of said first media gateway controller with an address of the first proxy, and
forward the control message containing the address of the first proxy to the first media gateway.

11. A system comprising:
a first media gateway controller configured to control a first media gateway, wherein the first media gateway controller is provided with a first operating protocol;
a second media gateway controller configured to control a second media gateway, wherein the second media gateway controller is provided with a second, different operating protocol;
a computer configured to:
perform address translation and provide proxies for said first media gateway and said second media gateway, wherein the address translation substitutes, in a message, an address of one of the proxies in place of an address of a corresponding one of the first and second media gateway controllers;
provide virtual gateways for respective ones of said first and second media gateway controllers, wherein said virtual gateways perform virtual bearer messaging between said first media gateway controller and said second media gateway controller;
relay messages between said first media gateway controller and said first media gateway; and
relay messages between said second media gateway controller and said second media gateway.

12. The system of claim 11, wherein a first one of the proxies is configured to communicate with the first media controller using the first operating protocol, and a second one of the proxies is configured to communicate with the second media gateway controller using the second operating protocol, wherein an address of the first proxy rather than an address of the first media gateway is provisioned at the first media gateway controller, and an address of the second proxy rather than an address of the second media is provisioned at the second media gateway controller.

13. A method comprising:
receiving, by a computer, a first control message from a first media gateway controller configured to control a first media gateway, wherein the first control message is according to a first operating protocol;
in response to the first control message, a first proxy in the computer forwarding the first control message to the first media gateway;
receiving, by the computer, a second control message from a second media gateway controller configured to control a second media gateway, wherein the second control message is according to a second operating protocol;
in response to the second control message, a second proxy in the computer forwarding the second control message to the second media gateway; and
relaying, by the computer, a third message between the first and second media gateway controllers to provide virtual bearer messaging between the first and second media gateway controllers.

14. The method of claim 13, wherein the first media gateway controller is provisioned with an address of the first proxy instead of an address of the first media gateway, and wherein the second media gateway controller is provisioned with an address of the second proxy instead of an address of the second media gateway.

15. The method of claim 13, further comprising:
the first proxy substituting, in the first control message, an address of the first media gateway controller with an address of the first proxy;
wherein the first proxy forwarding the first control message comprises sending the first control message containing the address of the first proxy to the first media gateway;
the second proxy substituting, in the second control message, an address of the second media gateway controller with an address of the second proxy; and
wherein the second proxy forwarding the second control message comprises sending the second control message containing the address of the second proxy to the second gateway.

16. A communication network arrangement comprising:
a plurality of media gateways;
a plurality of media gateway controllers, wherein each media gateway controller is configured to control a corresponding one of the media gateways, wherein said media gateway controllers are to employ different operating protocols to communicate with the corresponding media gateways, wherein each of said media gateway controllers and the corresponding one of the media gateways form a respective pair that communicate using a corresponding one of the operating protocols; and
a computer configured to perform gateway address translation between each paired media gateway and media gateway controller, wherein said computer is configured to further perform virtual bearer messaging between said plurality of media gateway controllers.

17. A non-transitory machine-readable storage medium storing instructions that when executed cause a computer to perform:
receiving a first control message from a first media gateway controller configured to control a first media gateway, wherein the first control message is according to a first operating protocol;
in response to the first control message, a first proxy in the computer forwarding the first control message to the first media gateway;
receiving a second control message from a second media gateway controller configured to control a second media gateway, wherein the second control message is according to a second operating protocol;
in response to the second control message, a second proxy in the computer forwarding the second control message to the second media gateway; and
relaying a third message between the first and second media gateway controllers to provide virtual bearer messaging between the first and second media gateway controllers.

18. The non-transitory machine-readable storage medium of claim 17, wherein the first media gateway controller is provisioned with an address of the first proxy instead of an address of the first media gateway, and wherein the second media gateway controller is provisioned with an address of the second proxy instead of an address of the second media gateway.

* * * * *